United States Patent
Sultenfuss et al.

(10) Patent No.: US 11,916,430 B2
(45) Date of Patent: Feb. 27, 2024

(54) OPTIMIZATION OF LOW POWER STATES WHILE AC LINE POWER AVAILABILITY IS LIMITED

(71) Applicant: Dell Products L.P., Round Rock, TX (US)

(72) Inventors: Andrew Thomas Sultenfuss, Leander, TX (US); Richard Christopher Thompson, Cedar Park, TX (US); Mohammed K. Hijazi, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 555 days.

(21) Appl. No.: 17/154,140

(22) Filed: Jan. 21, 2021

(65) Prior Publication Data

US 2022/0231532 A1 Jul. 21, 2022

(51) Int. Cl.
*H02J 7/16* (2006.01)
*H02J 50/80* (2016.01)
*H02J 50/05* (2016.01)

(52) U.S. Cl.
CPC .............. *H02J 7/163* (2013.01); *H02J 50/05* (2016.02); *H02J 50/80* (2016.02)

(58) Field of Classification Search
CPC .. H02J 7/163; H02J 50/05; H02J 50/80; H02J 2310/22; H02J 2310/58; H02J 1/14
See application file for complete search history.

(56) References Cited

U.S. PATENT DOCUMENTS

| | | | | |
|---|---|---|---|---|
| 6,564,332 B1 * | 5/2003 | Nguyen | ................ | G06F 1/3287 713/340 |
| 7,698,490 B2 * | 4/2010 | Terrell, II | ........... | G06F 13/4295 320/155 |
| 7,934,107 B2 * | 4/2011 | Walrath | ................ | G06F 1/3287 713/340 |
| 8,084,987 B2 * | 12/2011 | Hurtz | ...................... | H02J 7/342 323/901 |
| 8,533,514 B2 * | 9/2013 | Rogers | ...................... | G06F 1/30 713/340 |
| 9,069,540 B2 * | 6/2015 | Sultenfuss | .............. | G06F 1/266 |
| 9,337,503 B2 * | 5/2016 | Lenz | ...................... | B60L 50/72 |
| 9,913,228 B2 * | 3/2018 | Denic | ................ | H04B 7/15528 |
| 9,991,703 B1 * | 6/2018 | Maroney | ................... | H02J 5/00 |
| 10,019,049 B2 * | 7/2018 | Tan | ......................... | G06F 1/266 |

(Continued)

*Primary Examiner* — Pedro J Cuevas
(74) *Attorney, Agent, or Firm* — McDermott Will & Emery LLP

(57) ABSTRACT

A disclosed information handling system is coupled to a power adapter that is coupled to an AC line power source. The system includes an embedded controller storing instructions executable to determine that a trigger condition for limiting electrical power drawn by the system from the power adapter is met and, in response to the determination and in accordance with a low power operating mode, to limit electrical power drawn from the power adapter by the system to an amount less than or equal to the lesser of a power rating of the power adapter and a capacity of the AC line power source to supply electrical power. Limiting the electrical power drawn from the power adapter may include limiting the electrical power consumed by operation of the system or limiting a rate at which an internal battery of the system is charged by electrical power supplied by the power adapter.

20 Claims, 3 Drawing Sheets

(56) References Cited

U.S. PATENT DOCUMENTS

| | | | | |
|---|---|---|---|---|
| 10,148,087 | B2* | 12/2018 | Thompson | G05F 1/46 |
| 10,234,919 | B2* | 3/2019 | Daly | G05B 15/02 |
| 10,372,181 | B2* | 8/2019 | Hijazi | G06F 1/263 |
| 11,599,184 | B2* | 3/2023 | Kontorinis | G06F 1/28 |
| 11,720,158 | B2* | 8/2023 | Gan | G06N 20/00 713/330 |
| 2007/0252552 | A1* | 11/2007 | Walrath | G06F 1/3212 320/107 |
| 2008/0178032 | A1* | 7/2008 | Walrath | G06F 1/3287 713/340 |
| 2009/0070611 | A1* | 3/2009 | Bower, III | G06F 1/329 713/320 |
| 2009/0287949 | A1* | 11/2009 | Bradicich | G06F 1/3203 713/340 |
| 2009/0309541 | A1* | 12/2009 | Walrath | G06F 1/3287 320/107 |
| 2011/0119514 | A1* | 5/2011 | Kim | G06F 1/3203 709/224 |
| 2012/0078690 | A1* | 3/2012 | Harriman | G06F 1/266 713/300 |
| 2012/0331317 | A1* | 12/2012 | Rogers | G06F 1/28 713/320 |
| 2013/0117592 | A1* | 5/2013 | Humphrey | G06F 1/3203 713/320 |
| 2014/0095899 | A1* | 4/2014 | Sultenfuss | G06F 1/266 713/300 |
| 2014/0255810 | A1* | 9/2014 | Lenz | H01M 8/0494 429/430 |
| 2015/0372534 | A1* | 12/2015 | Thompson | H02J 7/007 307/66 |
| 2017/0123467 | A1* | 5/2017 | Ignowski | G06F 1/3206 |
| 2017/0220087 | A1* | 8/2017 | Hijazi | G06F 13/4086 |
| 2017/0220088 | A1* | 8/2017 | Tan | G06F 13/4022 |
| 2017/0222446 | A1* | 8/2017 | Tan | H02J 7/0042 |
| 2019/0067938 | A1* | 2/2019 | Thompson | G06F 1/26 |
| 2020/0310509 | A1* | 10/2020 | Gendler | G06F 1/3293 |
| 2021/0286419 | A1* | 9/2021 | Gan | G06F 1/305 |
| 2021/0373639 | A1* | 12/2021 | Kontorinis | G06F 9/5094 |
| 2022/0231532 | A1* | 7/2022 | Sultenfuss | H02J 1/14 |
| 2022/0390996 | A1* | 12/2022 | Sultenfuss | H02J 7/00712 |
| 2023/0070959 | A1* | 3/2023 | Kim | H02J 7/0047 |
| 2023/0088905 | A1* | 3/2023 | Kim | H02J 7/00714 320/162 |
| 2023/0103633 | A1* | 4/2023 | Dillon | H02J 4/00 700/291 |
| 2023/0297152 | A1* | 9/2023 | Gan | G06N 20/00 713/330 |
| 2023/0305618 | A1* | 9/2023 | Kontorinis | G06F 9/4893 713/320 |
| 2023/0315183 | A1* | 10/2023 | Messick | G06F 1/3206 713/340 |

* cited by examiner

OPTIMIZATION OF LOW POWER STATES WHILE AC LINE POWER AVAILABILITY IS LIMITED

BACKGROUND

Field of the Disclosure

This disclosure relates generally to information handling systems and, more particularly, to optimization of low power states while AC line power availability is limited.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable devices such as notebook computers, media players, personal data assistants, digital cameras, cellular phones, cordless phones, smart phones, tablet computers, and 2-in-1 tablet-laptop combination computers. A portable device may generally be any device that a user may carry for handheld use and that includes a processor. Typically, portable devices are powered using a rechargeable battery and include a display device.

SUMMARY

In one aspect, a disclosed method is for optimizing low power states while AC line power availability is limited. The method may include determining that a trigger condition for limiting electrical power drawn by an information handling system from a power adapter coupled to the information handling system is met and limiting, in response to the determining, the electrical power drawn from the power adapter by the information handling system to an amount less than or equal to the lesser of a power rating of the power adapter and a capacity of an AC line power source to which the power adapter is coupled to supply electrical power.

In any of the disclosed embodiments, determining that the trigger condition is met may include detecting a selection, based on a user input, of a low power operating mode in which the electrical power drawn from the power adapter by the information handling system is limited to an amount less than or equal to the lesser of a power rating of the power adapter and a capacity of an AC line power source to which the power adapter is coupled to supply electrical power from among a plurality of operating modes of the information handling system, the plurality of operating modes including the low power operating mode and a high power operating mode in which the amount of electrical power drawn from the power adapter by the information handling system is higher than the amount to which electrical power drawn from the power adapter by the information handling system is limited when operating in the low power operating mode.

In any of the disclosed embodiments, the method may include determining, subsequent to limiting the electrical power drawn from the power adapter by the information handling system, that the trigger condition is no longer met and, in response to determining that the trigger condition is no longer met, causing the information handling system to operate in the high power operating mode rather than in the low power operating mode.

In any of the disclosed embodiments, limiting the electrical power drawn from the power adapter by the information handling system may include limiting an amount of electrical power consumed by the information handling system for operation of the information handling system and the method may further include drawing additional electrical power for the operation of the information handling system from an internal battery of the information handling system.

In any of the disclosed embodiments, limiting the electrical power drawn from the power adapter by the information handling system may include drawing electrical power for operation of the information handling system from an internal battery of the information handling system and drawing electrical power for charging the internal battery of the information handling system from the power adapter.

In any of the disclosed embodiments, the method may further include providing an indication that the information handing system is operating in a low power mode in which the electrical power drawn from the power adapter by the information handling system is limited.

In a further aspect, a disclosed information handling system includes a port through which the information handling system is coupled to a power adapter, an internal battery, and an embedded controller. The controller has access to memory media storing instructions executable by the controller to determine that a trigger condition for limiting electrical power drawn by the information handling system from the power adapter coupled to the information handling system is met and to limit, in response to the determination, the electrical power drawn from the power adapter by the information handling system to an amount less than or equal to the lesser of a power rating of the power adapter and a capacity of an AC line power source to which the power adapter is coupled to supply electrical power.

In any of the disclosed embodiments, to determine that the trigger condition is met, the instructions may be further executable by the controller to detect a selection, based on a user input, of a low power operating mode in which the electrical power drawn from the power adapter by the information handling system is limited to an amount less than or equal to the lesser of a power rating of the power adapter and a capacity of an AC line power source to which the power adapter is coupled to supply electrical power from among a plurality of operating modes of the information handling system, the plurality of operating modes including the low power operating mode and a high power operating mode in which the amount of electrical power drawn from the power adapter by the information handling system is higher than the amount to which electrical power drawn from the power adapter by the information handling system is limited when operating in the low power operating mode.

In any of the disclosed embodiments, the instructions may be further executable by the controller to determine, subsequent to limiting the electrical power drawn from the power adapter by the information handling system, that the trigger condition is no longer met and, in response to determining that the trigger condition is no longer met, to cause the information handling system to operate in the high power operating mode rather than in the low power operating mode.

In any of the disclosed embodiments, to limit the electrical power drawn from the power adapter by the information handling system, the instructions may be further executable by the controller to limit an amount of electrical power consumed by the information handling system for operation of the information handling system and the instructions may be further executable by the controller to cause the information handling system to draw additional electrical power for the operation of the information handling system from the internal battery.

In any of the disclosed embodiments, to limit the electrical power drawn from the power adapter by the information handling system, the instructions may be further executable by the controller to draw electrical power for operation of the information handling system from the internal battery and to draw electrical power for charging the internal battery from the power adapter.

In any of the disclosed embodiments, the instructions may be further executable by the controller to provide an indication that the information handing system is operating in a low power mode in which the electrical power drawn from the power adapter by the information handling system is limited.

In any of the disclosed embodiments, determining that the trigger condition is met may include determining that the AC line power source to which the power adapter is coupled includes a power inverter.

In any of the disclosed embodiments, determining that the trigger condition is met may include determining the power rating of the power adapter.

In any of the disclosed embodiments, limiting the electrical power drawn from the power adapter by the information handling system may include limiting an amount of electrical power consumed by the information handling system for operation of the information handling system.

In any of the disclosed embodiments, limiting the electrical power drawn from the power adapter by the information handling system may include limiting a rate at which an internal battery of the information handling system is charged by electrical power supplied by the power adapter.

In any of the disclosed embodiments, the amount of electrical power to which electrical power drawn from the power adapter by the information handling system is limited may be dependent on one or more characteristics of the information handling system or the power adapter.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF PARTICULAR EMBODIMENT(S)

Figure 1:
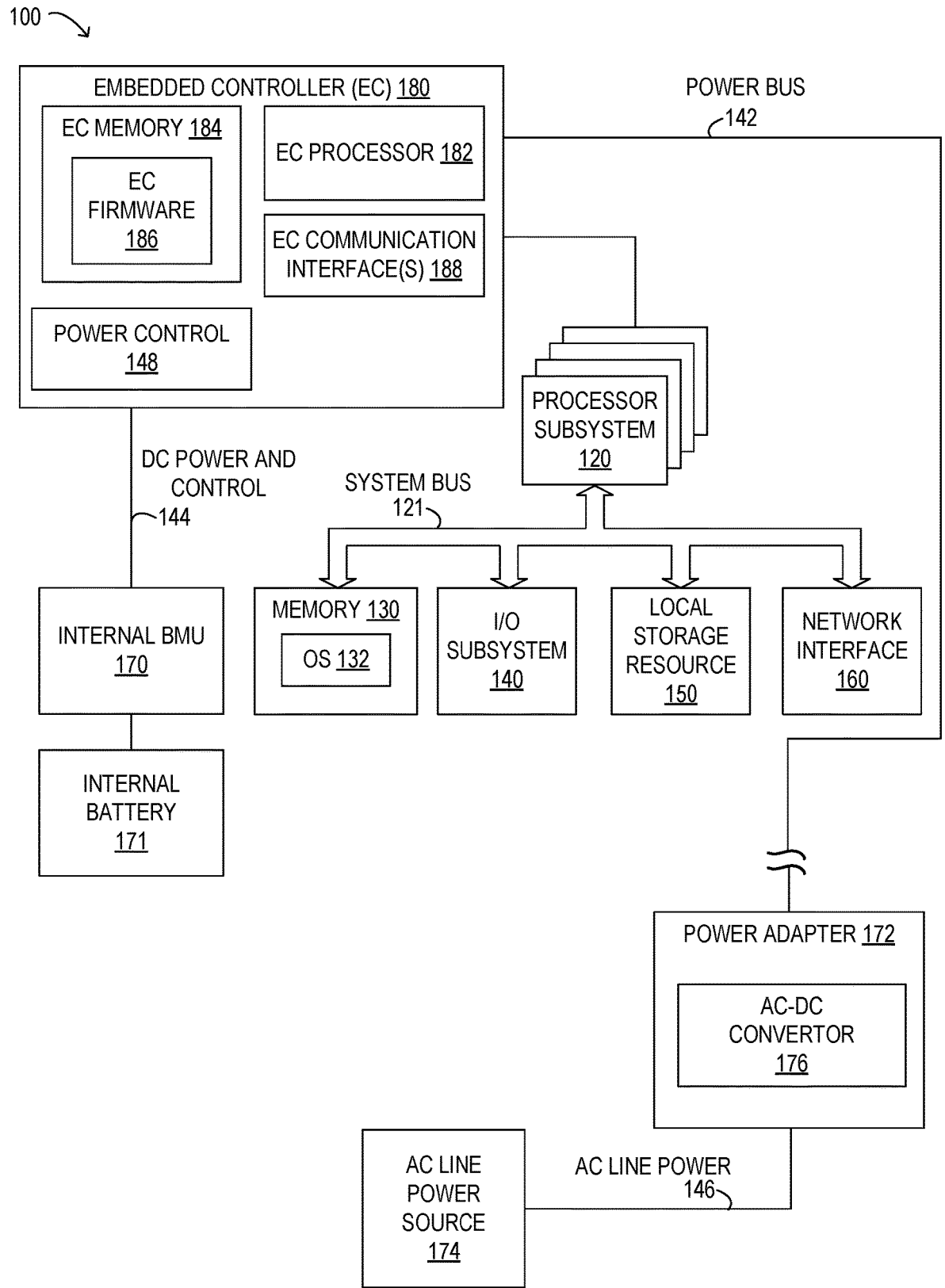
FIG. 1 is a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

Figure 2:
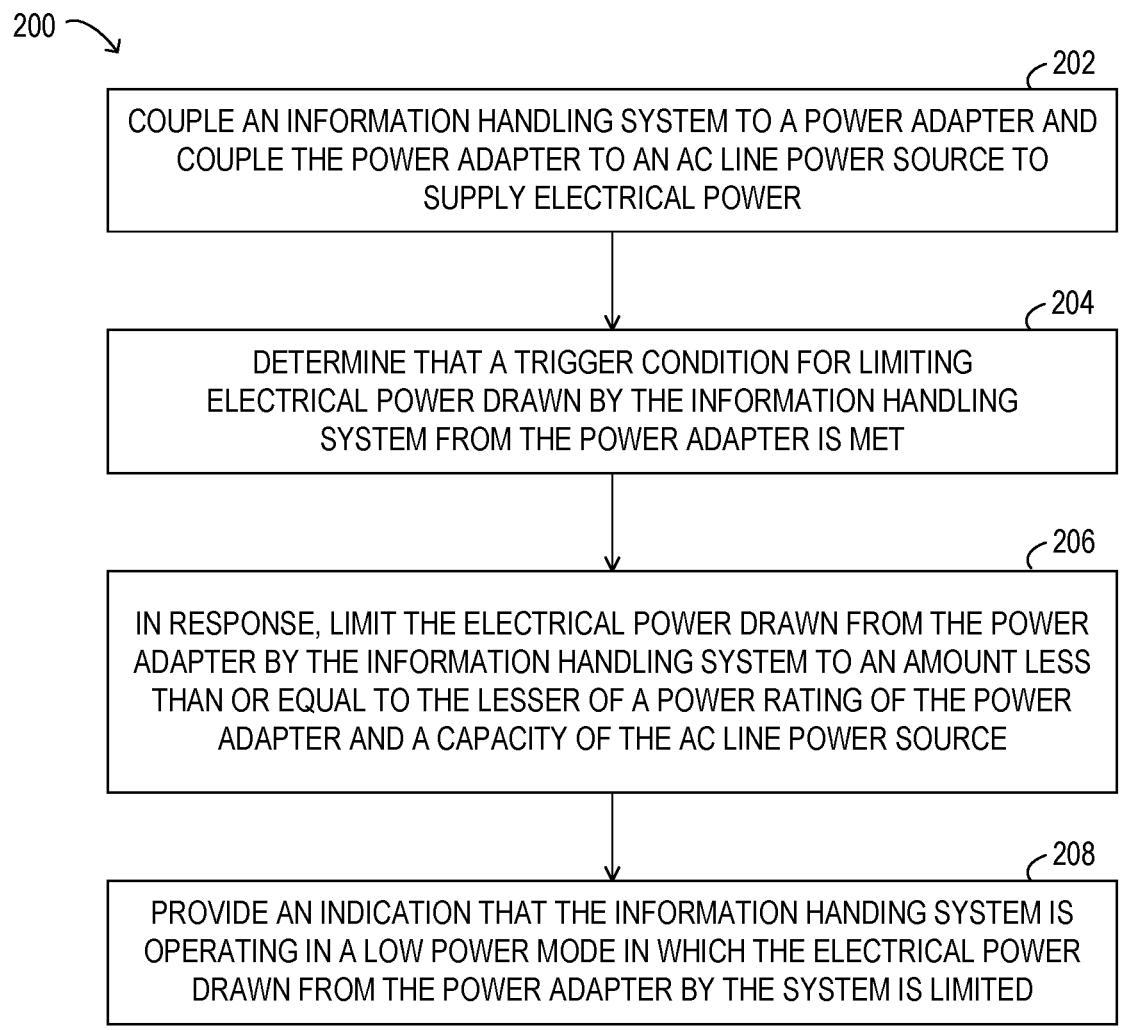
FIG. 2 is a flow chart of selected elements of a method for optimizing low power states of an information handling system, according to some embodiments.
Figure 3:
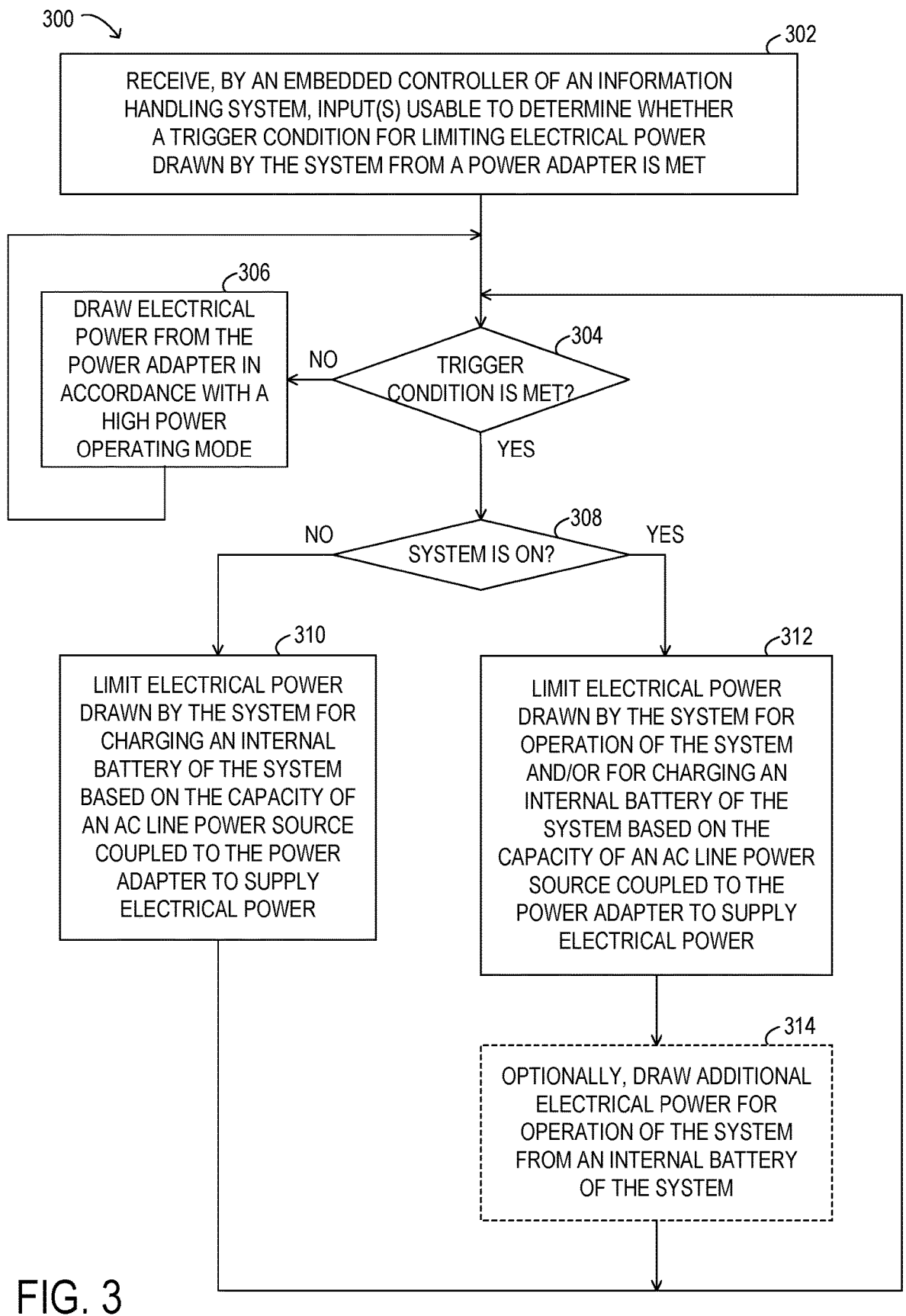
FIG. 3 is a flow chart of selected elements of a method for optimizing low power states while AC power availability is limited, according to some embodiments.

Particular embodiments are best understood by reference to FIGS. 1-3, wherein like numbers are used to indicate like and corresponding parts.

Turning now to the drawings, FIG. 1 illustrates a block diagram depicting selected elements of an embodiment of information handling system 100. It is noted that FIG. 1 is not drawn to scale but is a schematic illustration. As illustrated in FIG. 1, information handling system 100 is a portable information handling system. In various embodiments, portable information handling system 100 may represent different types of portable devices. A portable device may generally be any device that a user may carry for handheld use and that includes a processor. Typically, portable devices are powered using a rechargeable battery. Examples of portable information handling system 100 may include laptop computers, notebook computers, netbook computers, tablet computers, and 2-in-1 tablet laptop combination computers, among others. In some instances, portable information handling system 100 may represent certain personal mobile devices, and may further include examples such as media players, personal data assistants, digital cameras, cellular phones, cordless phones, smart phones, and other cellular network devices.

As shown in FIG. 1, components of information handling system 100 may include, but are not limited to, a processor subsystem 120, which may comprise one or more processors, and a system bus 121 that communicatively couples various system components to processor subsystem 120 including, for example, a memory 130, an I/O subsystem 140, local storage resource 150, and a network interface 160. Also shown within information handling system 100 is embedded controller 180 and an internal battery management unit (BMU) 170 that manages an internal battery 171. Furthermore, information handling system 100 is shown removably coupled to a power adapter 172 that incorporates various high efficiency features for use with portable information handling system 100, as disclosed herein. As shown, power adapter 172 may be an external device to portable information handling system 100 and may be coupled to portable information handling system 100 using power bus 142, for example, using an appropriate connector.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory 130). In the same or alternative embodiments, processor subsystem 120 may interpret and execute program instructions and process data stored remotely (e.g., in a network storage resource).

In FIG. 1, system bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Also in FIG. 1, memory 130 may comprise a system, device, or apparatus operable to retain and retrieve program instructions and data for a period of time (e.g., computer-readable media). Memory 130 may comprise random access memory (RAM), electrically erasable programmable read-only memory (EEPROM), a PCMCIA card, flash memory, magnetic storage, opto-magnetic storage or a suitable selection or array of volatile or non-volatile memory that retains data after power is removed. In FIG. 1, memory 130 is shown including an operating system (OS) 132, which may represent an execution environment for portable information handling system 100. Operating system 132 may be UNIX or be based on UNIX (e.g., a LINUX variant), one of a number of variants of Microsoft Windows® operating systems, a mobile device operating system (e.g., Google Android™ platform, Apple® iOS, among others), an Apple® MacOS operating system, an embedded operating system, a gaming operating system, or another suitable operating system.

In FIG. 1, local storage resource 150 may comprise computer-readable media (e.g., hard disk drive, floppy disk drive, CD-ROM, and other type of rotating storage media, flash memory, EEPROM, or another type of solid state storage media) and may be generally operable to store instructions and data, and to permit access to stored instructions and data on demand.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. In various embodiments, I/O subsystem 140 may be used to support various peripheral devices, such as a touch panel, a display adapter, a keyboard, an accelerometer, a touch pad, a gyroscope, or a camera, among other examples. In some implementations, I/O subsystem 140 may support so-called 'plug and play' connectivity to external devices, in which the external devices may be added or removed while portable information handling system 100 is operating.

Also shown in FIG. 1 is embedded controller (EC) 180, which may include EC processor 182 as a second processor included within portable information handling system 100 for certain management tasks, including supporting communication and providing various functionality with respect to internal BMU 170. Thus, EC processor 182 may have access to EC memory 184, which may store EC firmware 186, representing instructions executable by EC processor 182. In some embodiments, EC memory 184 may store instructions executable by the processor to perform one or more of the methods described herein for optimizing low power states while AC line power availability is limited. EC memory 184 may also store data, obtained and calculated values, thresholds, and parameters related to the methods described herein.

In some embodiments, EC firmware 186 may include pre-boot instructions executable by EC processor 182. For example, EC firmware 186 may be operable to prepare information handling system 100 to boot by activating various hardware components in preparation of launching an operating system for execution. Accordingly, in some embodiments, EC firmware 186 may include a basic input/output system (BIOS). In certain embodiments, EC firmware 186 includes a Unified Extensible Firmware Interface (UEFI) according to a specification promulgated by the UEFI Forum (uefi.org). Embedded controller 180 may execute EC firmware 186 on EC processor 182 even when other components in information handling system 100 are inoperable or are powered down. Furthermore, EC firmware 186 may be in control of EC communication interface(s) 188, which may represent one or more input/output interfaces or signals that embedded controller 180 can use to communicate with other elements of information handling system 100, such as processor subsystem 120 or I/O subsystem 140, among others.

Also shown within embedded controller 180 is power control 148, which may be responsible for managing electrical power connections between power adapter 172, internal BMU 170, and portable information handling system 100. In some embodiments, power control 148 may be implemented as a separate controller external to embedded controller 180. For example, when power bus 142 supplies electrical power to portable information handling system 100, power control 148 may determine whether the electrical power is used to charge internal battery 171 or to directly power portable information handling system 100. Power control 148 may also manage so-called 'soft start up' of portable information handling system 100, such as when portable information handling system 100 awakes from a low power state, such as sleep mode, by determining a source of electrical power during the low power state and managing operation of portable information handling system 100 during the low power state. Power control 148 may accordingly route electrical power and communicate with internal BMU 170 via DC power and control 144, which may represent suitable connections between embedded controller 180 and internal BMU 170, for example. It is noted that in some embodiments, at least certain portions of power control 148 may be implemented using EC firmware 186, such as specialized executable instructions for power management and control.

In particular embodiments, power bus 142 may be used to receive DC power from an external source, such as a power adapter 172. For example, the DC power received from the external source may be routed via DC power and control connection 144 to internal BMU 170 for purposes of charging internal battery 171 or otherwise powering portable information handling system 100.

As illustrated in FIG. 1, portable information handling system 100 may include a battery management unit (BMU) 170 that controls operation of internal battery 171. In particular implementations, internal BMU 170 may be embedded within a respective battery whose operation BMU 170 controls. For example, BMU 170 may monitor information associated with, and control charging operations of, internal battery 171. In operation, BMU 170 may control operation of internal battery 171 to enable sustained operation, such as by protecting the battery. Protection of internal battery 171 by BMU 170 may comprise preventing the battery from operating outside of safe operating conditions, which may be defined in terms of certain allowable voltage and current ranges over which the battery can be expected to operate without causing self-damage. For example, internal BMU 170 may modify various parameters in order to prevent an over-current condition (whether in a charging or discharging mode), an over-voltage condition during charging, an under-voltage condition while discharging, or an over-temperature condition, among other potentially damaging conditions.

In various embodiments, internal battery 171 illustrated in FIG. 1 may include one or more cells having a particular chemistry in a particular cell configuration. For example, in one embodiment, the battery may include four Lithium-ion cells in a two parallel-two serial (2S-2P) configuration. In other embodiments, the battery may include a different number of cells or may include multiple cells in a different configuration. For example, the battery may include three or more cells in various configurations. In some embodiments, the battery may include one or more cells based on any one of a variety of Lithium-ion electrochemistries, or one or more cells based a different electrochemistry than Lithium-ion.

As shown in FIG. 1, power adapter 172 may be designed to removably couple to portable information handling system 100 using power bus 142. For example, power bus 142 may include power connections for electrically coupling power adapter 172 to portable information handling system 100 as an external load on power adapter 172. In some embodiments, power bus 142 may also include a communication link to enable power adapter 172 to communicate with portable information handling system 100, such as via embedded controller 180. For example, power adapter 172 may communicate battery data collected locally at power adapter 172 to portable information handling system 100 over a communication link within power bus 142. In other embodiments, there may be a communication link between power adapter 172 and portable information handling system 100 that is separate from power bus 142 instead of, or in addition to, a communication link that is part of power bus 142. In some embodiments, a communication link between power adapter 172 and portable information handling system 100, or DC power and control 144, may operate in accordance with a System Management Bus (SMBus) protocol for sending and receiving data.

In various embodiments, internal battery 171 may include at least certain portions of a main power circuit across positive and negative terminals, a current sensor, a voltage sensor, one or more battery cells, a fuse, and a power switch (not shown). The current sensor may represent a shunt resistor, or other current sensing element, over which a voltage that is directly proportional to the current flowing through the main power circuit is measured. The battery cells may store and output electrical energy based on a given electrochemical composition internal to the battery cells. The voltage sensor may enable voltage measurement of individual battery cells, or measurement of an aggregate voltage for the battery including all battery cells operating together. A temperature sensor may be located in proximity to the battery cells to provide an accurate indication of a temperature within the battery. The fuse may be a safety element for limiting current flowing through the main power circuit. The power switch may be an electronically controlled switching element that closes or opens the main power circuit, and thereby allows the battery to operate for charging or discharging.

In FIG. 1, internal BMU 170 may include a charging unit (not shown in FIG. 1) that may control charging cycles for internal battery 171. Internal BMU 170 may also be enabled to obtain various types of information associated with a battery and to make decisions according to the obtained information. For example, internal BMU 170 may monitor various charging-related parameters or other operating parameters received from internal battery 171. In some embodiments, parameters monitored by internal BMU 170 may include, but are not limited to, a charging current, a voltage, and a temperature associated with internal battery 171.

In some embodiments, embedded controller 180 may implement a voltage control module that senses the current drawn by an electrical load and provides a control signal to internal BMU 170 based on the current drawn by the electrical load. For example, the voltage control module may be implemented as executable code stored by EC memory 184, while the electrical load may be information handling system 100, or portions thereof. It may be advantageous, for example, to provide a higher voltage to the electrical load in order to minimize the power dissipated by losses incurred in transmitting current from internal battery 171 to the electrical load. In another embodiment, the voltage control module may provide control signals in response to a voltage set signal. The voltage set signal may instruct the voltage control module to control internal BMU 170 to produce a particular voltage at the load. For example, the particular voltage level may allow the load to operate in a desired mode of operation. In one embodiment, the particular voltage level indicated by the voltage set signal may be higher than the voltage output by cells within a battery. Internal BMU 170 may boost the voltage output by the cells to the voltage indicated by the voltage set signal.

In some embodiments, internal battery 171 may provide electrical power to the information handling system 100 at an output voltage controlled by internal BMU 170. In some cases, portable information handling system 100 may provide load state information to the voltage control module. In some embodiments, the load state information may be based on the operating mode of the load, or on a desired future operating mode of the load. The voltage control module may determine a voltage level based on the load state information and may provide voltage control information based on the determined voltage level to internal BMU 170.

In FIG. 1, power adapter 172 is shown receiving AC line power 146 from an external power source. AC line power 146 may represent a connection to AC line power source 174, such as using a standard line power cable. In some embodiments, AC line power 146 may be a removable connection, such as a cable that plugs into line power at a wall socket acting as the AC line power source 174 and plugs into a corresponding receptacle included with power adapter 172. In other embodiments, AC line power 146 may represent a connection to an electrical outlet on an airplane or vehicle or a connection to an electrical outlet on a power inverter.

Also included within power adapter 172 in FIG. 1 is AC-DC converter 176. AC-DC converter 176 may receive alternating current (AC) via AC line power 146 and may output one or more DC voltages for supplying electrical power to information handling system 100. For example, an output DC voltage from AC-DC converter 176 may be supplied to information handling system 100 via power bus 142, in some embodiments.

In some embodiments, in operation, power adapter 172 may supply portable information handling system 100 with electrical power, as governed by a power delivery contract. However, under certain conditions, the power delivery contract may not be desirable to maintain optimal efficiency and long run times under battery power. In some embodiments, power adapter 172 may be connected to an AC line power source 174 with a limited capacity for supplying electrical power. As described in more detail below, when the electrical power available to be supplied to portable information handling system 100 through power adapter 172 is relatively low, portable information handling system 100 may limit the amount of electrical power drawn from power adapter 172 for charging internal battery 171 and/or for operating information handling system 100.

Some high performance information handling systems (e.g., high performance business or gaming systems) may be bundled with high capacity power adapters, such as power adapters with 180-watt, 240-watt, or 330-watt power ratings. These adapters can trip circuit breakers when used on airplanes or when connected to other AC line power sources with limited capacity to supply electrical power. For example, a typical electrical outlet on an airplane may only be capable of supplying electrical power at 75 watts, while a high performance laptop computer may be connected to the electrical outlet through a 240-watt laptop adapter. A similar situation may occur when an information handling system is connected to an electrical outlet in a car, a camper, or another type of vehicle, or in any scenario in which a power inverter feeds a conventional electrical outlet. Some information handling systems may include fast-charge batteries (which may require more than 100 watts for fast charging) and may be bundled with small, high-power adapters. In these and other scenarios in which the capacity of the power adapter to supply electrical power is limited and/or when the power adapter is connected to an AC line power source with limited capacity to supply electrical power, it may be desirable to limit the amount of electrical power drawn from the power adapter by the information handling system.

In at least some embodiments of the present disclosure, when a high performance information handling system is connected, through a power adapter, to a standard AC line power source, such as an electrical outlet in a home or office environment, an embedded control of the information handling system (such as EC 180) may allow the system to operate in a high power operating mode in which it draws as much electrical power as it needs, up to the power rating of the power adapter, to operate the system and/or to keep the internal battery of the system charged. In some embodiments, a user may select a "normal" or "high power" operating mode to indicate that EC 180 should select appropriate settings for power control 148 to support a standard AC line power input and to allow the system to draw electrical power from the power adapter at the full value indicated by a power supply identifier (PSID) for the adapter. On the other hand, when the high performance information handling system is connected, through a power adapter, to an AC line power source with limited capacity to supply electrical power, a user may select a low power operating mode, such as an airplane mode or another low power mode associated with a fixed limit (e.g., 75 watts) or configurable limit on the amount of electrical power drawn from the power adapter by the system, i.e., addressing the situation through load throttling rather than source throttling. In response, EC 180 may select appropriate settings for power control 148 to reflect the limited capacity of the AC line power source to supply electrical power to the system. This, in turn, may prevent boot and/or high power operating modes at least until the internal battery of the information handling system is sufficiently charged. In some embodiments, a default setting for any low power operating mode may cause the amount of electrical power drawn by the information handling system to be no more than 75 watts, but a user may be able to select a different, higher amount of electrical power to be drawn by the system if the maximum capacity of the AC line power source is known to be higher than 75 watts.

Referring now to FIG. 2, selected elements of an embodiment of method 200 for optimizing low power states of an information handling system. as described herein, are depicted in flow chart form. Method 200 may be performed using information handling system 100 in conjunction with a power adapter 172 and an AC line power source 174. In various embodiments, some or all of the steps of method 200 may be performed by an embedded controller of the information handling system, such as embedded controller 180. It is noted that certain operations described in method 200 may be optional or may be rearranged, in different embodiments.

Method 200 may begin, at step 202, with coupling an information handling system, such as a high performance information handling system, to a power adapter and coupling the power adapter to an AC line power source to supply electrical power to the system. For example, the power adapter may be coupled to an electrical outlet on an airplane with a capacity to supply electrical power at no more than 75 watts or the power adapter may be coupled to an electrical outlet of an inverter in a vehicle with a capacity to supply electrical power at no more than 100 watts.

Method 200 may include, at step 204, determining that a trigger condition for limiting electrical power drawn by the information handling system from the power adapter is met. In one example, determining that a trigger condition is met may include, in response to a user of the information handling system being instructed by a flight attendant to put the system in an airplane mode, the information handling system detecting that it is operating in an airplane mode. In another example, determining that the trigger condition is met may include detecting a selection, based on a user input, of a low power operating mode other than an airplane mode in which the electrical power drawn from the power adapter by the information handling system is limited to an amount less than or equal to the lesser of a power rating of the power adapter and a capacity of the AC line power source to supply electrical power, or detecting that a flag indicating selection of a low power operating mode is set. The low power operating mode may be selected from among multiple operating modes of the information handling system that include the low power operating mode and a high power operating mode in which the amount of electrical power drawn from the power adapter by the information handling system is higher than the amount to which electrical power drawn from the power adapter by the information handling system is limited when operating in the low power operating mode. In yet another example, determining that the trigger condition is met may include determining that the AC line power source to which the power adapter is coupled is a power inverter. In some embodiments, determining that the trigger condition is met may include determining the power rating of the power adapter, e.g., by reading or receiving a PSID from the power adapter or by detecting the state of a power level switch on the power adapter.

The method may include, at step 206, in response to determining that a trigger condition has been met, limiting the electrical power drawn from the power adapter by the information handling system to an amount less than or equal to the lesser of a power rating of the power adapter and a capacity of the AC line power source to supply electrical power. The amount of electrical power to which electrical power drawn from the power adapter by the information handling system is limited may be dependent on one or more characteristics of the information handling system or the power adapter. In some embodiments, if the system is operating in an airplane mode, the amount of electrical power drawn from the power adapter by the information handling system may be limited to a default setting for an airplane mode or a default setting for all low power operating modes, such as 75 watts, even if the power adapter itself is rated for 180 watts, 240 watts, or 330 watts, for example. In some embodiments, the user of the information handling system may (e.g., using an application executing on the system) be able to set the limit on the amount of electrical power drawn from the power adapter to another value, e.g., a managed level higher than a default setting for airplane modes or low power modes, if the user has knowledge that the actual capacity of the AC line power source is higher than the default value. For example, in response to selection of a low power operating mode, EC 180 may set the limit on the amount of electrical power drawn from the power adapter to 75 watts by default, after which the user may raise the limit to 100 watts if the AC line power source is an inverter capable of supplying electrical power at that higher level.

In some embodiments, limiting the electrical power drawn from the power adapter by the information handling system may include limiting an amount of electrical power consumed by the information handling system for operation of the information handling system. In some embodiments, limiting the electrical power drawn from the power adapter by the information handling system may include limiting a rate at which the internal battery of the information handling system is charged by electrical power supplied by the power adapter. In some embodiments, limiting the electrical power drawn from the power adapter by the information handling system may include causing the system to operate in a hybrid mode. For example, in one hybrid mode, if the internal battery of the information handling system is charged to level sufficient to allow hybrid mode, electrical power may be sourced from the power adapter up to a limit associated with a low power operating mode and this electrical power may be supplement with additional electrical power supplied by the internal battery. In this example, EC 180 may ensure that the battery level of the internal battery is maintained, manage the average system low power mode allowing power to be supplied by the power adapter at or near the limit of the AC line power source to supply electrical power, account for efficiency losses to keep the internal battery near full to enable continuous hybrid operation, and/or cause the system to exit the hybrid mode as the internal battery nears a predetermined lower threshold value for state of charge. In another hybrid mode, limiting the electrical power drawn from the power adapter by the information handling system may include limiting an amount of electrical power consumed by the information handling system for operation of the information handling system and drawing additional electrical power for the operation of the information handling system from the internal battery. In yet another hybrid mode, limiting the electrical power drawn from the power adapter by the information handling system may include drawing electrical power for operation of the information handling system from the internal battery and drawing electrical power for charging the internal battery of the information handling system from the power adapter.

At step 208, method 200 may include providing an indication that the information handing system is operating in a low power mode in which the electrical power drawn from the power adapter by the system is limited. For example, an indication of a current low power operating mode setting or an indication of a change to a low power operating mode setting on the system may be presented to the user through a GUI of an application executing on the system or through another type of notification mechanism implemented on the system.

In some embodiments, the amount of load throttling implemented by an information handling system when coupled to a power adapter that is coupled to an AC line power source with limited capacity to supply electrical power, e.g., in one of the hybrid operating modes described herein, may be dependent on the condition of the internal battery of the system, such as its state of charge. For example, if the internal battery is supplying supplemental electrical power to boost performance higher than is possible when sourcing electrical power only from the power adapter, but the charge level of the internal battery begins to drop, the amount of electrical power drawn from the combination of the internal battery and the power adapter may be decreased and/or re-balanced in order to maintain a reasonable charge level on the battery.

Referring now to FIG. 3, selected elements of an embodiment of method 300 for optimizing low power states while AC power availability is limited, as described herein, are depicted in flow chart form. Method 300 may be performed using information handling system 100 in conjunction with a power adapter 172 and an AC power source 174. In various embodiments, some or all of the steps of method 300 may be performed by an embedded controller of the information handling system, such as embedded controller 180. It is noted that certain operations described in method 300 may be optional or may be rearranged, in different embodiments.

Method 300 may begin, at step 302, with receiving, by an embedded controller of an information handling system, one or more inputs usable to determine whether a trigger condition for limiting electrical power drawn by the system from a power adapter is met. In one example, the inputs may include a user input indicating selection of an airplane mode or selection of another low power operating mode associated with a fixed or configurable limit on the amount of electrical power drawn from the power adapter by the system. In another example, the inputs may include an indication of the current operation mode, whether it is a low power operating mode or a default high power operating mode. In yet another example, the inputs may include the state of a low power flag indicating whether or not a low power operating mode, rather than a default high power operating mode, has been selected. In some embodiments, the inputs may include an indication of the power rating of the power adapter (which may include, or be based on, the PSID of the power adapter or the state of a power level switch on the power adapter) or an indication of the current or expected load on the power adapter. Other flags or variables indicative of characteristics of the information handling system or power adapter may serve as inputs to determine whether a trigger condition is met, in various embodiments.

Method 300 may include, at step 304, determining whether such a trigger condition is met. For example, determining that the trigger condition is met may include detecting a selection, based on a user input, of a low power operating mode in which the electrical power drawn from the power adapter by the information handling system is limited to an amount less than or equal to the lesser of a power rating of the power adapter and a capacity of an AC line power source to which the power adapter is coupled to supply electrical power. The low power operating mode may be selected from among multiple operating modes of the information handling system, including the low power operating mode and a high power operating mode in which the amount of electrical power drawn from the power adapter by the information handling system is higher than the amount to which electrical power drawn from the power adapter by the information handling system is limited when operating in the low power operating mode. In some embodiments, determining that the trigger condition is met may include determining that the AC line power source to which the power adapter is coupled includes a power inverter. In some embodiments, determining that the trigger condition is met may include determining the power rating of the power adapter, e.g., by reading or receiving a PSID from the power adapter or by detecting the state of a power level switch on the power adapter. In some embodiments, determining that the trigger condition is met may include detecting that a low power flag is set.

If no such trigger condition is met, the method may proceed to step 306, and the information handling system may draw electrical power from the power adapter in accordance with a high power operating mode until and unless it is determined that such a trigger condition is met. For example, the system may draw a default amount of electrical power from the power adapter based on the power rating of the power adapter.

If and when a trigger condition for limiting electrical power drawn by the system from the power adapter is met, method 300 may continue to step 308. If, at step 308, it is determined that the system is not on (e.g., is not operating), the method may continue at step 310, with limiting the electrical power drawn from the power adapter by the system for charging an internal battery of the system based on the capacity of an AC line power source coupled to the power adapter to supply electrical power, while refraining from drawing electrical power from the power adapter for operating the system. For example, if the internal battery of the information handling system is at a very low state of charge, the system may not be able to boot and operate until and unless there is enough power in the internal battery to support the system through at least a boot cycle. Once the internal battery is charged to a predetermined threshold state of charge, it may be allowed to boot and to operate using power drawn from the power adapter and/or supplied by the internal battery. In another example, in response to determining that a trigger condition for limiting electrical power drawn by the system from the power adapter is met and that the system is off, the system, or an embedded controller thereof, may send a command to the internal BMU to charge the internal battery in a low power mode.

If, at step 308, it is determined that the system is on (e.g., is operating), method 300 may proceed to step 312. At step 312, the method may include limiting the electrical power drawn by the system for operation of the system and/or for charging an internal battery of the system based on the capacity of an AC line power source coupled to the power adapter to supply electrical power, after which the method may, optionally, proceed to step 314. In one example, the information handling system may operate using the internal battery as the primary power source while the system limits the battery charge rate below the limit associated with a low power operating mode (e.g., 75 watts in the case of an airplane mode, or 100 watts in another low power operating mode). In this example, to preserve runtime, the information handling system may operate in a low power operating mode when the internal battery is the primary power source, disabling any high performance or any so-called "turbo" operating modes. In this example, the user may choose for the system to operate with the internal battery as the primary power source for operating the system and to draw electrical power from the power adapter for charging the internal battery, and the internal battery itself may limit the amount of electrical power drawn from the power adapter by setting its maximum charge rate accordingly. In some embodiments, a first control loop may be used to limit the amount of electrical power drawn for charging the internal battery of the information handling system and a second control loop may be used to limit the amount of electrical power drawn for operating the system. In some embodiments, there may be a handshake between the system control and the internal battery and, based on an exchange of that information, the charging and discharging capabilities may be separately controlled.

At step 314, method 300 may, optionally, include drawing additional electrical power for operation of the system from an internal battery of the system. In some embodiments, the user may select one of several hybrid operating modes in which electrical power is drawn from the internal battery for operation of the system. In one example hybrid operating mode, the amount of electrical power drawn from the power adapter and consumed by the information handling system for operation of the information handling system may be limited and additional electrical power may be drawn from the internal battery for the operation of the information handling system. In another example hybrid operating mode, electrical power for the operation of the information handling system may be drawn exclusively or primarily from the internal battery and electrical power for charging the internal battery of the information handling system may be drawn exclusively or primarily from the power adapter.

As illustrated in FIG. 3, any or all of the operations of method 300 shown as steps 306 through 314 may be repeated, one or more times, to switch from a high power operating mode to a low power operating mode, or vice versa, based on whether or not current conditions cause a trigger condition for limiting the electrical power drawn by the system from the power adapter to be met. For example, after determining that a trigger condition for limiting the amount of electrical power drawn from the power adapter has been met, the information handling system may operating in an appropriate low power operating mode until and unless conditions indicate that the operating mode should be changed to a high power operating mode or to a different low power operating mode. For example, in some embodiments, method 300 may include determining, subsequent to limiting the electrical power drawn from the power adapter by the information handling system, that the trigger condition is no longer met and, in response, causing the information handling system to operate in the high power operating mode rather than in the low power operating mode (not shown in FIG. 3).

In some embodiments, at least some of the techniques described herein for controlling low power operating states of a high performance information handling system and/or a high performance power adapter when coupled to a limited AC line power source may be used to control low power operating states of a high performance information handling system when it is coupled to a power adapter having a limited power rating rather than a high performance power adapter. In one example, when the high performance information handling system is coupled to a power adapter having a limited power rating (such as a small travel adapter with a power rating of 30 watts), the user may provide an input to cause the system to limit the amount of electrical power drawn from the travel adapter to an amount less than or equal to its power rating. In this example, the user may provide an input selecting a low power operating mode for the system or an input that causes a low power flag to be set, as described above. In response, the system may limit the amount of electrical power drawn from the travel adapter and might or might not supplement the electrical power drawn from the travel adapter with electrical power supplied by an internal battery of the system in any suitable hybrid mode including, but not limited to, those described herein. In this example, when and if the high performance information handling system is subsequently coupled to a high performance power adapter, the user may select a different low power operating mode or a high power operating mode in which to operate depending on the power rating of the high performance power adapter and/or the capacity of an AC line power source coupled to the high performance power adapter to supply electrical power.

In some embodiments, at least some of the techniques described herein for controlling low power operating states of a high performance information handling system and/or a high performance power adapter when coupled to a limited AC line power source may be used to control low power operating states of a standard or relatively low performance information handling system that includes a fast-charging battery when the system is coupled to a high-power adapter that is, in turn, coupled to an AC line power source having a limited capacity to supply electrical power. For example, the system may require electrical power to be supplied at 100 watts or more for fast charging. However, when coupled to an AC line power source with a limited capacity to supply electrical power, such as an electrical outlet on an airplane, the techniques described herein may be used to limit the amount of electrical power supplied to the system for charging the internal battery, e.g., by causing the system to operate in a low power operating mode or in a suitable hybrid operating mode such as, but not limited to, one of those described herein.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method, comprising:
   determining that a trigger condition for limiting electrical power drawn by an information handling system from a power adapter coupled to the information handling system is met;
   in response to determining that the trigger condition is met:
      limiting the electrical power drawn from the power adapter by the information handling system to an amount less than or equal to the lesser of a power rating of the power adapter and a capacity of an AC line power source to which the power adapter is coupled to supply electrical power;

throttling a computing load at the information handling system; and supplementing the electrical power drawn from the power adapter by drawing based on the throttled computing load and electrical power drawn from the power adapter, additional electrical power for execution of the computing load at the information handling system from an internal battery of the information handling system, wherein the computing load is throttled and an amount of the additional electrical power that is drawn from the internal battery such that a full charge level of the internal battery is maintained.

2. The method of claim 1, wherein determining that the trigger condition is met comprises detecting a selection, based on a user input, of a low power operating mode in which the electrical power drawn from the power adapter by the information handling system is limited to an amount less than or equal to the lesser of a power rating of the power adapter and a capacity of an AC line power source to which the power adapter is coupled to supply electrical power from among a plurality of operating modes of the information handling system, the plurality of operating modes including the low power operating mode and a high power operating mode in which the amount of electrical power drawn from the power adapter by the information handling system is higher than the amount to which electrical power drawn from the power adapter by the information handling system is limited when operating in the low power operating mode.

3. The method of claim 2, further comprising:
determining, subsequent to limiting the electrical power drawn from the power adapter by the information handling system, that the trigger condition is no longer met; and in response to determining that the trigger condition is no longer met, causing the information handling system to operate in the high power operating mode rather than in the low power operating mode.

4. The method of claim 1, wherein determining that the trigger condition is met comprises determining that the AC line power source to which the power adapter is coupled comprises a power inverter.

5. The method of claim 1, wherein determining that the trigger condition is met comprises determining the power rating of the power adapter.

6. The method of claim 1, wherein limiting the electrical power drawn from the power adapter by the information handling system comprises limiting an amount of electrical power consumed by the information handling system for operation of the information handling system.

7. The method of claim 1, wherein limiting the electrical power drawn from the power adapter by the information handling system comprises limiting a rate at which an internal battery of the information handling system is charged by electrical power supplied by the power adapter.

8. The method of claim 1, wherein:
limiting the electrical power drawn from the power adapter by the information handling system comprises limiting an amount of electrical power consumed by the information handling system for operation of the information handling system.

9. The method of claim 1, wherein limiting the electrical power drawn from the power adapter by the information handling system comprises:
drawing electrical power for charging the internal battery of the information handling system from the power adapter.

10. The method of claim 1, wherein the amount of electrical power to which electrical power drawn from the power adapter by the information handling system is limited is dependent on one or more characteristics of the information handling system or the power adapter.

11. The method of claim 1, further comprising providing an indication that the information handing system is operating in a low power operating mode in which the electrical power drawn from the power adapter by the information handling system is limited.

12. An information handling system, comprising:
a port through which the information handling system is coupled to a power adapter;
an internal battery; and
an embedded controller having access to memory media storing instructions executable by the controller to:
determine that a trigger condition for limiting electrical power drawn by the information handling system from the power adapter coupled to the information handling system is met;
in response to determining that the trigger condition is met:
limit the electrical power drawn from the power adapter by the information handling system to an amount less than or equal to the lesser of a power rating of the power adapter and a capacity of an AC line power source to which the power adapter is coupled to supply electrical power;
throttle a computing load at the information handling system; and
supplement the electrical power drawn from the power adapter by drawing, based on the throttled computing load and electrical power drawn from the power adapter, additional electrical power for execution of the computing load at the information handling system from an internal battery of the information handling system,
wherein the computing load is throttled and an amount of the additional electrical power that is drawn from the internal battery such that a full charge level of the internal battery is maintained.

13. The information handling system of claim 12, wherein to determine that the trigger condition is met, the instructions are further executable by the controller to detect a selection, based on a user input, of a low power operating mode in which the electrical power drawn from the power adapter by the information handling system is limited to an amount less than or equal to the lesser of a power rating of the power adapter and a capacity of an AC line power source to which the power adapter is coupled to supply electrical power from among a plurality of operating modes of the information handling system, the plurality of operating modes including the low power operating mode and a high power operating mode in which the amount of electrical power drawn from the power adapter by the information handling system is higher than the amount to which electrical power drawn from the power adapter by the information handling system is limited when operating in the low power operating mode.

14. The information handling system of claim 13, wherein the instructions are further executable by the controller to:

determine, subsequent to limiting the electrical power drawn from the power adapter by the information handling system, that the trigger condition is no longer met; and in response to determining that the trigger condition is no longer met, cause the information handling system to operate in the high power operating mode rather than in the low power operating mode.

15. The information handling system of claim 12, wherein to determine that the trigger condition is met, the instructions are further executable by the controller to determine that the AC line power source to which the power adapter is coupled comprises a power inverter or to determine the power rating of the power adapter.

16. The information handling system of claim 12, wherein to limit the electrical power drawn from the power adapter by the information handling system, the instructions are further executable by the controller to limit an amount of electrical power consumed by the information handling system for operation of the information handling system.

17. The information handling system of claim 12, wherein to limit the electrical power drawn from the power adapter by the information handling system, the instructions are further executable by the controller to limit a rate at which the internal battery is charged by electrical power supplied by the power adapter.

18. The information handling system of claim 12, wherein:

to limit the electrical power drawn from the power adapter by the information handling system, the instructions are further executable by the controller to limit an amount of electrical power consumed by the information handling system for operation of the information handling system.

19. The information handling system of claim 12, wherein to limit the electrical power drawn from the power adapter by the information handling system, the instructions are further executable by the controller to:

draw electrical power for charging the internal battery of the information handling system from the power adapter.

20. The information handling system of claim 12, wherein the instructions are further executable by the controller to provide an indication that the information handing system is operating in a low power operating mode in which the electrical power drawn from the power adapter by the information handling system is limited.

* * * * *